Patented Dec. 24, 1929

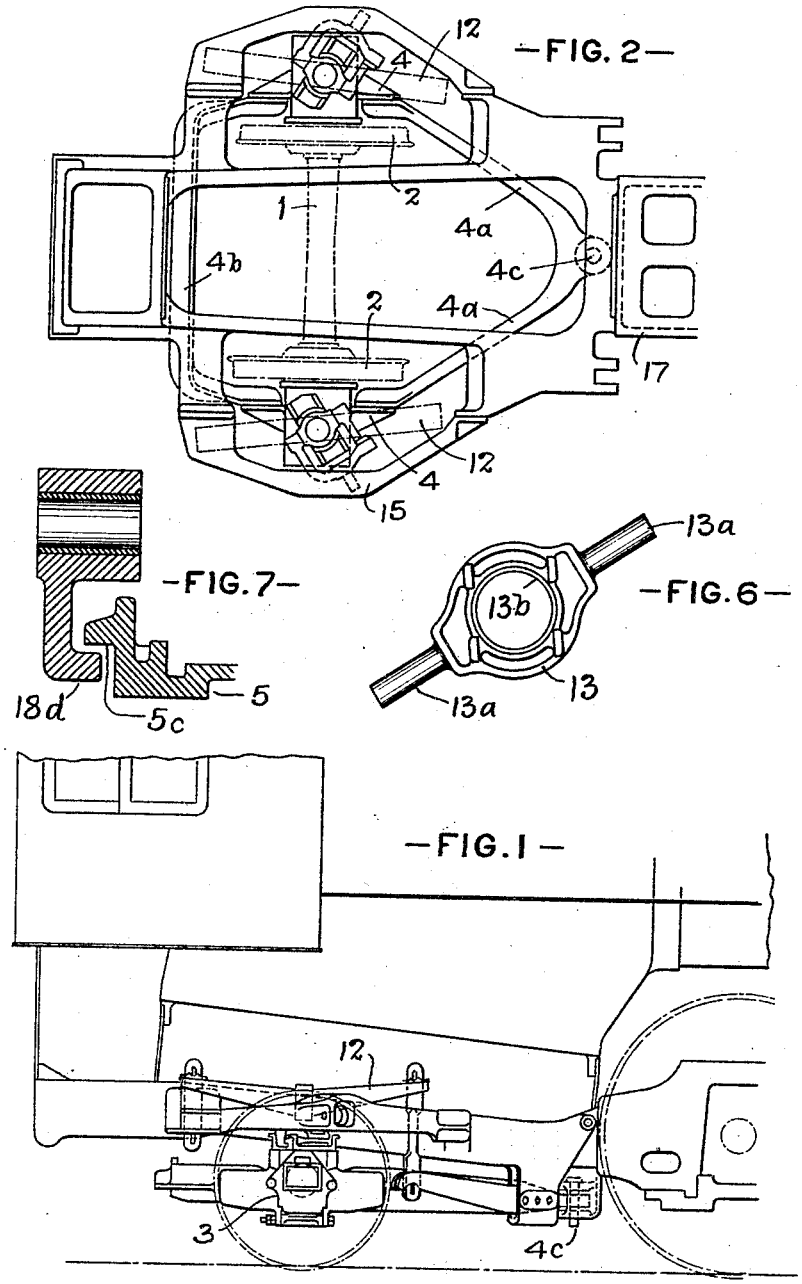

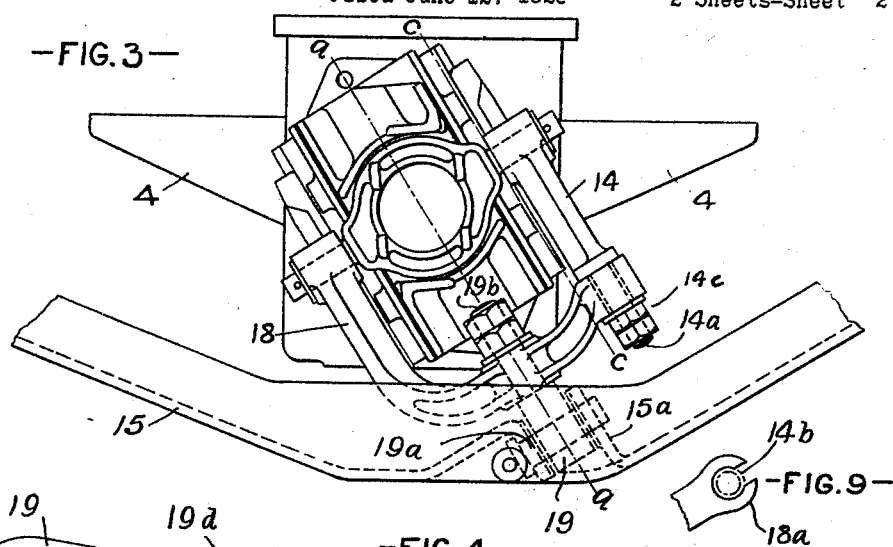
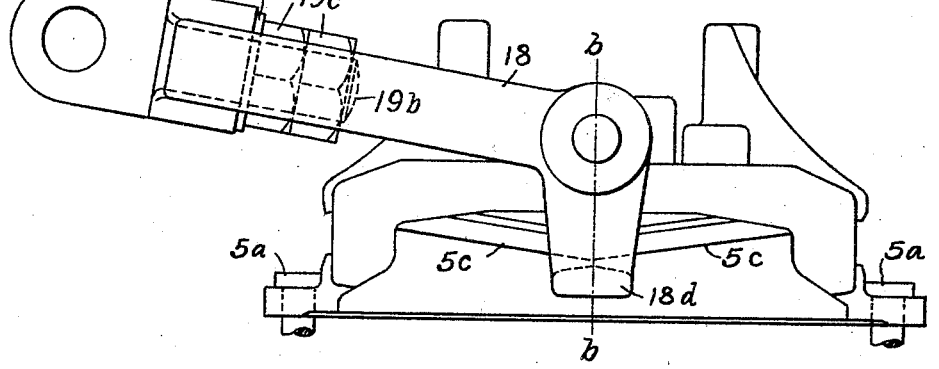
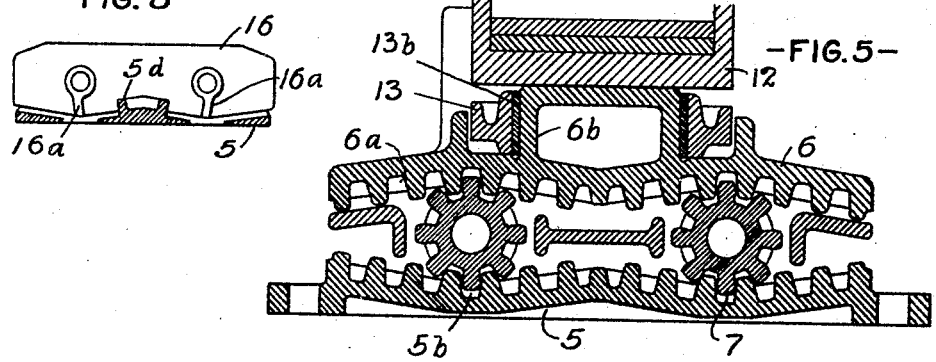

1,740,440

UNITED STATES PATENT OFFICE

JAMES G. BLUNT, OF SCHENECTADY, NEW YORK

CENTERING APPLIANCE FOR LOCOMOTIVE TRAILING TRUCKS

Application filed June 12, 1928. Serial No. 284,847.

This invention relates, generally, to means for centering locomotive trailing trucks of the Cole type, and, particularly, is an improvement on those set forth in Letters Patent of the United States No. 1,524,775, granted and issued to this applicant, James G. Blunt, for improvement in Truck centering devices, under date of February 3, 1925, and in an application for patent, filed by said applicant, September 17, 1926, Ser. No. 136,058.

The object of the present invention is to provide simple, compact, and substantial means for effecting connection between the spring seats of a truck and a rigid spring yoke of the type set forth in application Ser. No. 136,058 aforesaid, in order to obtain a relatively universal movement of the connected members.

The improvement claimed is hereinafter fully set forth.

In the accompanying drawings: Figure 1 is a side view, in elevation, of the rear end portion of a locomotive engine, illustrating an application of the invention; Fig. 2, a plan view of the same, with the firebox removed; Fig. 3, a plan view, on an enlarged scale, of a spring seat, a portion of the adjoining yoke, and the connecting links; Fig. 4, an end view, in elevation, of the same; Fig. 5, a vertical section, on a further enlarged scale, on the line, $a\ a$, of Fig. 3; Fig. 6, a plan view, on an enlarged scale, of the equalizer; Fig. 7, a vertical section, on the line, $b\ b$, of Fig. 4, showing the link and a portion of the lower roller seat; Fig. 8 a vertical section, on the line, $c\ c$, of Fig. 3, showing the stop on the lower roller seat; and, Fig. 9, a view, in elevation, of a portion of the connecting link.

In the practice of the invention, referring descriptively to the specific embodiment thereof in a locomotive trailing truck which is herein exemplified, an axle, 1, on which a pair of wheels, 2, is secured, is fitted to rotate in journal boxes, 3, which are formed integrally with side frame members, 4. Said side frame members are secured to forwardly and inwardly extending radius bar arms, $4^a$, and a rear transverse bar, $4^b$. The truck frame is, in the usual manner, pivotally connected to the main frame, 17, of the locomotive, by a radius bar pin $4^c$, located in the longitudinal central plane of the truck, at the forward extremity of the radius bar arms.

A lower roller seat, 5, is located on the top of each of the journal boxes, 3, and is secured thereto by dowels, $5^a$, and by welding. The upper face of the roller seat, 5, is, as in Patent No. 1,524,775 aforesaid, provided with racks, $5^b$, comprising alternately inclined sets of teeth, which are engaged by toothed rollers, 7, said rollers also engaging teeth on corresponding alternately oppositely bevelled inclined racks, $6^a$, on upper roller seats, 6. The upper roller seats, 6, are provided, at their centres, with spring seats, $6^b$, in the form of vertical cylindrical projections or trunnions, on the flat tops of which, the springs, 12, are seated, and the peripheries of which constitute bearings for equalizer bushings, $13^b$.

The equalizers, 13, are provided with cylindrical extensions, $13^a$, which form bearings for the links, 14 and 18, by which the springs are coupled, pivotally, to the fixed V shaped brackets, 15. Said brackets are rigidly connected to the rearwardly extending members of the main frame, 17, of the locomotive. The links, 14 and 18, when assembled, form a yoke, which is coupled to the brackets, 15, by pins, $19^a$, passing through an extension, 19, and a jaw, $15^a$, on the bracket, 15. The extension, 19, is attached to the link, 18, by means of a cylindrical extension, $19^b$, fitted into a hole in the link, and secured by nuts, $19^c$. The distance between the equalizer, 13, and the bracket, 15, may be varied, by changing the thickness of the washer, $19^d$, and by introducing a washer between the shoulder on the extension, 19, and the link, 18. For the purpose of assembly, the link, 18, is provided with an open end jaw $18^a$, through which a cylindrical extension, $14^a$, may be passed. A bushing, $14^b$, may then be introduced, and nuts, $14^c$, applied.

It will be obvious that the links, 14 and 18, form the means connecting the truck to the locomotive frame, and maintaining the springs in longitudinal alignment with the frame, at the same time providing for all the movements of the truck, relatively to the locomotive.

The teeth on the upper and lower roller seats are held in engagement with those of the roller, by means of hook shaped extensions, $18^d$, formed on the links, 14 and 18, which travel under the lower inclined surfaces of the projecting flanges, $5^c$, on the lower roller seat, 5. The surfaces, $5^c$, are oppositely inclined, so that the extension, $18^d$, which travels with the upper roller seat, may rise on either side of its central position, and still have a small constant clearance from the flange, $5^c$.

The travel of the rollers is limited by ribs, $16^a$, formed on the roller guide, 16. Said ribs project, so as to contact with a lug, $5^d$, on the lower roller seat, 5, when the relative predetermined travel has taken place.

The invention claimed and desired to be secured by Letters Patent, is:

1. In a centering appliance for locomotive trucks, the combination of a truck frame; journal boxes, fitted therein; springs, through which weight is transmitted to the truck frame from the main frame of the locomotive; spring seats, supporting said springs; an equalizer, for permitting movement of the spring seats, relatively to the main frame of the locomotive; and links, adapted to couple said equalizer pivotally to said frame, and extending normally, at right angles to lines extending from the axis of a truck pivot pin in the truck frame to the centres of the spring seats.

2. In a centering appliance for locomotive trucks, the combination, with a truck frame and journal boxes fitted therein, of lower roller seats, having alternately reversed inclines on their upper faces, and secured to the journal boxes; correspondingly formed, relatively movable, upper roller seats; spring seats, in the form of flat topped cylindrical projections extending upwardly on the upper roller seats; rollers, interposed between the upper and lower roller seats; equalizers having an eye in the centre, fitting the cylindrical body of the spring seat, links, each having an eye on one end fitting a cylindrical extension on the equalizer, and means on the opposite ends for coupling said links to the main frame of the locomotive.

3. In a centering appliance for locomotive trucks, the combination, with a truck frame and journal boxes fitted therein, of lower roller seats, having alternately reversed inclines on their upper faces, and secured to the journal boxes; correspondingly formed, relatively movable, upper roller seats; spring seats, in the form of flat topped cylindrical projections extending upwardly on the upper roller seats; rollers, interposed between the upper and lower roller seats; equalizers having an eye in the center, fitting the cylindrical body of the spring seat; links, each having an eye on one end fitting a cylindrical extension on the equalizer; means on the opposite ends for coupling said links to brackets on the main frame of the locomotive; and safety hooks on said links adapted to project under overhanging flanges on the lower roller seat, the contour of the lower surface of said flanges being designed to confine the vertical movement of the link, within the limits of normal operation.

4. In a locomotive, the combination of a locomotive frame, a truck, a lateral motion device mounted on the truck, a bracket rigid with the locomotive frame and projecting therefrom laterally beyond the lateral motion device, and a universal joint means coupling the lateral motion device to the bracket.

5. In a locomotive, the combination of a locomotive frame, a truck, a lateral motion device mounted on the truck, a yoke projecting laterally from the locomotive frame and rigid therewith, and universal joint means coupling the lateral motion device to the yoke.

6. In a locomotive, the combination of a locomotive frame, a truck, a lateral motion device embodying upper and lower roller seats mounted on the truck, a bracket rigid with the locomotive frame and projecting therefrom laterally beyond the lateral motion device, means flexibly coupling the lateral motion device to the bracket, and means for positively limiting the degree to which the seats may separate in a vertical direction.

7. In a locomotive, the combination of a locomotive frame, a truck, a lateral motion device embodying upper and lower roller seats mounted on the truck, a yoke projecting laterally from the locomotive frame and rigid therewith, universal joint means coupling the lateral motion device to the yoke, and means for positively limiting the degree to which the seats may separate in a vertical direction.

8. In a locomotive, the combination of a truck, a lateral motion device, mounted on the truck, a locomotive frame structure having a rigid lateral extended portion projecting beyond the lateral motion device, and universal joint means coupling the lateral motion device with said extended portion.

JAMES G. BLUNT.